(12) United States Patent
Rao

(10) Patent No.: US 12,744,445 B2
(45) Date of Patent: Sep. 22, 2026

(54) MAGNETIC COUPLER FOR RETROFIT PROPULSION SYSTEM

(71) Applicant: Integrated Technologies Group, Culver City, CA (US)

(72) Inventor: Shankar S. Rao, Porter Ranch, CA (US)

(73) Assignee: INTEGRATED TECHNOLOGIES GROUP, Culver City, CA (US)

( * ) Notice: Subject to any disclaimer, the term of this patent is extended or adjusted under 35 U.S.C. 154(b) by 217 days.

(21) Appl. No.: 18/634,125

(22) Filed: Apr. 12, 2024

(65) Prior Publication Data

US 2024/0348141 A1 Oct. 17, 2024

Related U.S. Application Data

(60) Provisional application No. 63/458,856, filed on Apr. 12, 2023.

(51) Int. Cl.
*H02K 49/10* (2006.01)
*B63H 23/22* (2006.01)

(52) U.S. Cl.
CPC .......... *H02K 49/106* (2013.01); *B63H 23/22* (2013.01)

(58) Field of Classification Search
CPC ................................ H02K 9/06; B63H 23/22
See application file for complete search history.

(56) References Cited

U.S. PATENT DOCUMENTS 11,394,255 B2 * 7/2022 Pilgrim .................... H02K 7/08

FOREIGN PATENT DOCUMENTS

EP 2180583 B1 * 8/2012 .......... F04D 13/027

OTHER PUBLICATIONS

Machine translation of EP 2180583; Hayoz et al. (Year: 2012).*

* cited by examiner

*Primary Examiner* — Terrance L Kenerly
(74) *Attorney, Agent, or Firm* — Fletcher Yoder, P.C.

(57) ABSTRACT

A system includes a magnetic coupler. The magnetic coupler includes an inner coupling comprising at least two first sections, wherein the inner coupling is configured to be coupled to a drive shaft of a vessel. The magnetic coupler additionally includes an outer coupling comprising at least two second sections, wherein the outer coupling is configured to coaxially surround the inner coupling with a radial gap disposed therebetween. The system further includes a drive source configured to be coupled to the outer coupling of the magnetic coupler.

17 Claims, 7 Drawing Sheets

MAGNETIC COUPLER FOR RETROFIT PROPULSION SYSTEM

CROSS REFERENCE TO RELATED APPLICATIONS

This application is a Non-Provisional Application claiming priority to U.S. Provisional Patent Application No. 63/458,856, entitled "MAGNETIC COUPLER FOR RETROFIT PROPULSION SYSTEM", filed Apr. 12, 2023, which is herein incorporated by reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Advances in technologies in the automotive industry have allowed for an increase in the development if hybrid gas-electric automobiles. Hybrid automobiles allow for the reduction of fuel consumption and the emissions associated therewith. In contrast, propulsion systems for marine vessels typically continue to utilize traditional fuel (e.g., diesel or gasoline) powered engines. Additionally, many of the marine vessels in use today were designed with fuel powered engines only, resulting in difficulties in converting existing marine vessels to hybrid power systems. With the potential of crude oil becoming dormant within the next few decades the pressure for alternate sources of energy is immense. To say the least challenges are overwhelming; to compound the challenges global efforts for green energy and reduction of carbon footprint is the priority of the century.

DETAILED DESCRIPTION

Figure 1:
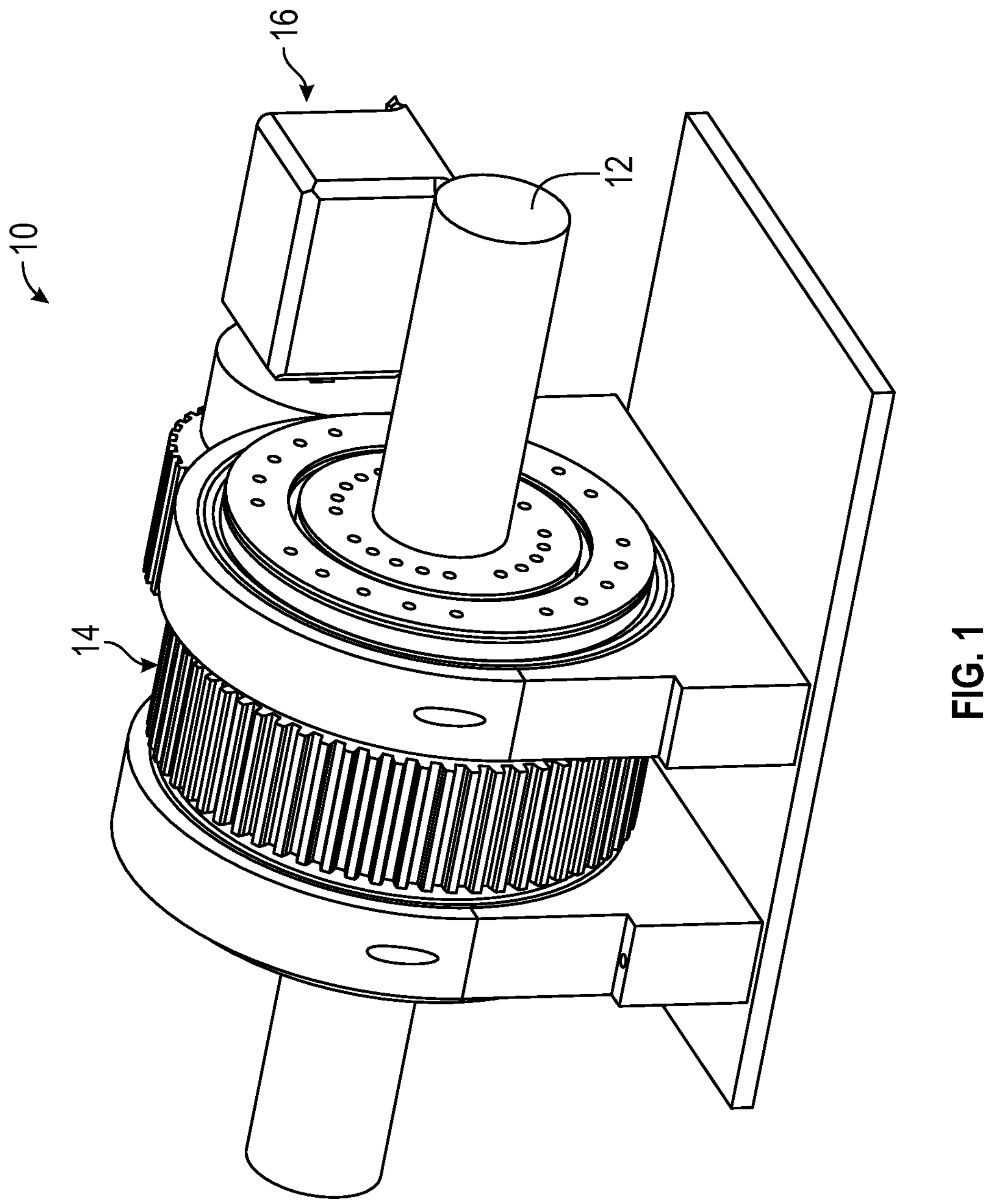
FIG. 1 illustrates a perspective view of a drive system, in accordance with an embodiment.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Typically, boats/vessels/ships/submarines (e.g., marine vessels) are driven by diesel engine and a gearbox which engages the propeller/impeller/turbine depending upon the size of the marine vessel. There is a large opportunity for hybridization of vessels, such as marine vessels, if the hybridization can be implemented without removal of existing components. As a result, an electric turbine driven by a hybrid combination of a power source (e.g., batteries, a hydrogen fuel cell and/or the use of electric traction) is needed. This combination is more fuel-efficient and would reduce the carbon footprint to practically zero in some cases of a marine vessel. Consequently, there are thousands of sea vessels that can be retrofitted with a new design. However, one of the major challenges is that the shaft of the impeller cannot be axially loaded as this can cause catastrophic stresses, wear and tear, and potentially shear in the drive shaft which encounters an enormous amount of axially and radial thrust due to the harsh operating conditions as deployed in the sea/ocean.

Present embodiments achieve hybridization and/or electric only powering of a vessel while addressing the above concerns. For example, as described herein, through the use of magnetic coupling, additional rotation can be imparted to a drive shaft of a vessel using a drive system inclusive of a magnetic coupler that is driven by an external drive source, for example, an electric motor. That is, additional (or sole) rotation of the drive shaft can be provided by the drive system utilizing the devices described herein. Furthermore, the magnetic coupler driven by the external drive source can be coupled to an existing drive shaft, allowing for a retrofit of existing propulsion systems without costly downtime to the vessel and/or replacement or alteration to an existing driveshaft of the vessel. For example, the magnetic coupler can be installed (i.e., assembled and/or disassembled) around an existing drive shaft of a vessel without disassembly or removal of the drive shaft. Moreover, inclusion of the magnetic coupler can operate increase the efficiency and/or the power of the vessel depending on how the magnetic coupler is operated (e.g., in a drive mode in which the magnetic coupler rotates the drive shaft without engine (e.g., combustion engine) assistance, in a hybrid mode in which the magnetic coupler rotates the drive shaft while the engine operates at a lower output level, or in a boost mode when the magnetic coupler rotates the drive shaft in addition to the engine operating at an upper output level).

With the foregoing in mind, FIG. 1 illustrates side view of a drive system 10 that can be coupled to a drive shaft 12 of a vessel, for example, a marine vessel. As will be described in greater detail, the drive system 10 allows for overcoming typical obstacles encountered in retrofitting an existing boat/ship/vessel/submarine (e.g., a marine vessel) with an electric direct-drive system. In some embodiments, the drive system 10 includes a magnetic coupler 14 and a drive source 16, e.g., an electric motor. The magnetic coupler 14 can operate to provide a non-contact transfer of torque from the drive source 16 to the drive shaft 12. Indeed, in operation, the magnetic coupler 14 is physically coupled to the drive source 16 and receives a torque from the drive source 16 that drives a first magnetic hub of the magnetic coupler 14. Driving of this first magnetic hub of the magnetic coupler 14 operates to magnetically transmit torque to a second magnetic hub of the magnetic coupler 14. This second magnetic hub is physically coupled to the drive shaft 12 of the vessel and allows for rotation to be imparted to the drive shaft 12 to alone rotate the drive shaft 12 (or to provide rotation in conjunction with an engine of the vessel). Moreover, as will be described in greater detail below, the drive shaft 12 is wrapped around with split coupling magnets of the magnetic coupler 14 that can be mounted on the drive shaft 12 without dismantling or disturbing the present architecture of the power transmission of the marine vessel. In this manner, the magnetic coupler 14 is a split magnetic field coupler.

As noted above, the drive source 16 may be an electric motor and can also operate as an electric generator. The drive source 16 can be coupled to a power source, for example, one or more batteries (e.g., lithium ion batteries or other rechargeable batteries), one or more fuel cells, and/or similar or additional sources of electrical power. Additionally, a controller may be included to control an amount of power transmitted between the drive source and the power source. For example, the controller can operate to cause the drive source 16 to operate as a motor to provide rotation to the drive shaft 12 via the magnetic coupler 14 (e.g., to allow for either electric propulsion of a vessel when the engine of a vessel is shut off or hybrid propulsion of the vessel when the drive system 10 operates in parallel or otherwise in conjunction with an engine of the vessel) or as a generator (e.g., by receiving torque from the drive shaft 12 via the magnetic coupler 14, causing electricity to be generated and transmitted to the power source to recharge the power source). In other embodiments, the power source can be independently be charged or replaced separate from operation of the drive system 10. Similarly, the controller can operate, for example, to electrically decouple the drive source 16 from the power source so that an engine of the vessel can solely power the drive shaft 12 (i.e., so that the drive shaft 12 rotates without assistance from the drive system 10 and no recharging of the power source coupled to the drive system 10 occurs).

The controller may be part of a larger computing system or a centralized control system. Alternatively the controller may be part of a standalone unit electric power controller that operates to control functionality of the drive system and/or its associated elements (e.g., the power source). In some embodiments, the controller may be communicatively coupled to a main control system, for example, a control system in a command room or a bridge of a vessel that allows for centralized control of one or more portions of the vessel. The controller and/or any computing or control system associated therewith, may operate in conjunction with software systems implemented as computer executable instructions stored in a (tangible) non-transitory machine readable medium, such as memory, a hard disk drive, or other short term and/or long term storage. Particularly, the techniques to described below with respect to control of aspects of the power source and/or other components of the drive system 10 may be accomplished, for example, using code or instructions stored in the non-transitory machine readable medium and may be executed, for example, by the controller as well as by additional separate controllers controlling aspects of the operation of the drive system 10 inclusive of or separate from the operation of the drive source 16.

The controller may be a general purpose or a special purpose processing device, such as one or more application specific integrated circuits (ASICs), one or more processors, or another processing device that interacts with one or more tangible, non-transitory machine-readable medium (e.g., machine readable media) that collectively stores instructions executable by the controller to perform the methods and actions described herein. By way of example, such machine-readable media can comprise RAM, ROM, EPROM, EEPROM. CD-ROM or other optical disk storage, magnetic disk storage or other magnetic storage devices, or any other medium which can be used to carry or store desired program code in the form of machine-executable instructions or data structures and which can be accessed by the controller. In some embodiment, the instructions executable by the controller are instead generated and transmitted to the controller via separate processing device of a computing system and are used to generate, for example, control signals or input signals to effect control of the power source and/or the drive source 16.

Any computing system controlling the controller or control system inclusive of the controller may also include one or more input structures (e.g., one or more of a keypad, mouse, touchpad, touchscreen, one or more switches, buttons, or the like) to allow a user to interact with the computing system, for example, to start, control, or operate a graphical user interface (GUI) or applications running on the computing system and/or to start, control, or operate, for example, components utilized in a drive operation. Alternatively, the control system of computing system operating the controller may instead automatically control the operation of the controller based either on inputs from a user or measured inputs of the drive system 10 that correspond to predetermined operations.

Figure 2:
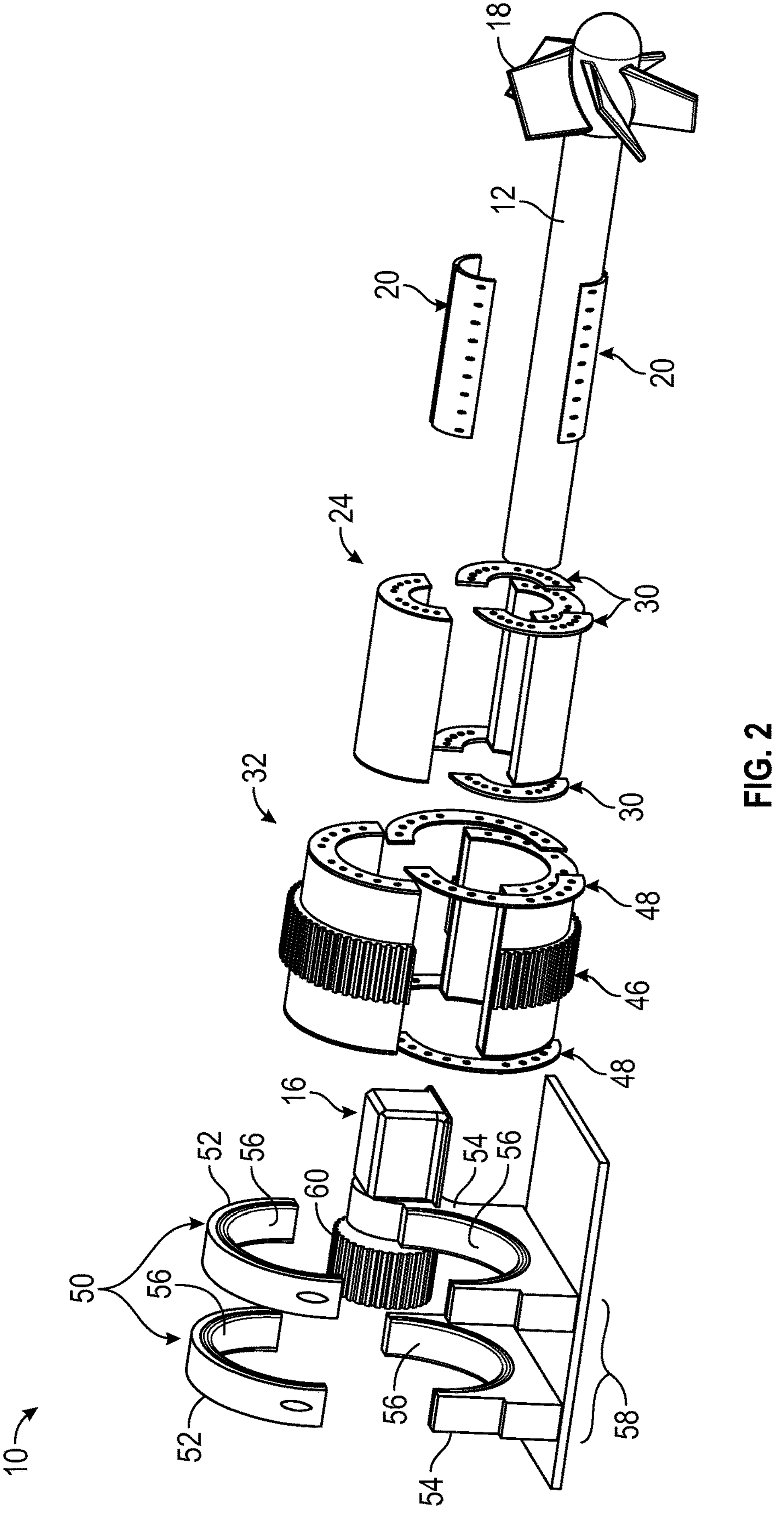
FIG. 2 illustrates an exploded view of the drive system of FIG. 1, in accordance with an embodiment.

FIG. 2 illustrates an exploded view of the drive system 10. As illustrated, the drive shaft 12 of a vessel is coupled to a propeller 18 such that rotation of the drive shaft 12 imparts rotation to the propeller 18 to propel a vessel, for example, a marine vessel. Rotation of the drive shaft 12 may be driven by an engine (e.g., a combustion engine such as a gasoline engine, a diesel engine, etc.). However, by adding the drive system 10 to a vessel (e.g., in addition to the engine of the vessel), hybrid powering and/or electric only powering of the vessel may be accomplished. That is, the drive system 10 can be utilized in parallel with the engine of the vessel to rotate the drive shaft 12 to power the propeller 18. Additionally, in some embodiments, the engine of the vessel may be shut down and the drive system 10 alone may impart rotation to the drive shaft 12 to power the propeller 18. More particularly, the drive system 10 may be coupled to the drive shaft 12 via one or more hub mounts 20.

Figure 3:
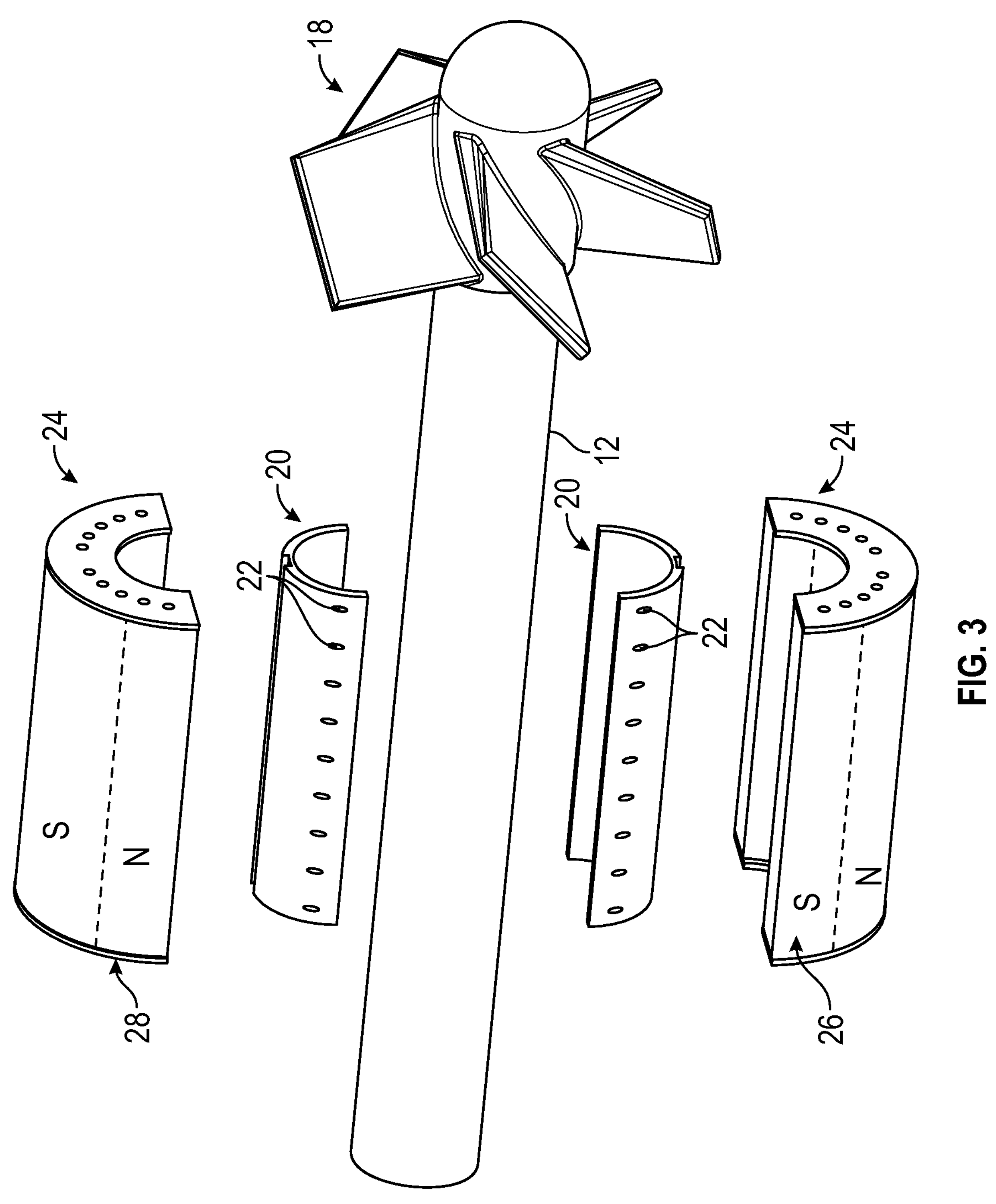
FIG. 3 illustrates an exploded side view of a first portion of the drive system of FIG. 1, in accordance with an embodiment.

FIG. 3 illustrates a side view of the hub mounts 20 of FIG. 2 in greater detail. As illustrated, the hub mounts 20 can be affixed directly about the drive shaft 12. One or more apertures 22 may be present in the hub mounts 20 to allow for a connector or fastener (e.g., bolt and nut, a pin, a screw, a nail, an anchor, a rivet, etc.) to couple one hub mount 20 to another. While two hub mounts 20 are illustrated, it should be noted that a single hub mount 20 or more than two hub mounts 20 can be utilized. Additionally, in some embodiments, the hub mounts 20 completely circumferentially surround the drive shaft 12 so that rotation of the hub mounts 20 is directly imparted to the drive shaft 12 (or, if the hub mounts 20 are not being rotated by the drive source 16, the drive shaft 12 rotates the hub mounts 20). Additionally, the hub mounts 20 can be installed about an existing drive shaft 12 without removal of the drive shaft 12 from the vessel.

The hub mounts 20 may be made of metal. For example, the hub mounts 20 may be a carbon-steel composite. Additionally, the hub mounts may operate as a back iron to form a return path of flux between adjacent magnets. Indeed, as illustrated in FIG. 3, the hub mounts 20 are coupled about the drive shaft 12 and a coupling 24 (e.g., an inner coupling, inner coupler, or a male coupling) is directly coupled about the hub mounts 20. The coupling 24 may include, for example, encapsulated magnets that directly contact the hub mounts 20. Thus, for example, the coupling 24 completely circumferentially surrounds the hub mounts 20 so that rotation of the coupling 24 (and the magnets therein) is directly imparted to the hub mounts 20 (or, if the coupling 24 is not being rotated by the drive source 16, rotation of the hub mounts 20 rotates the coupling 24).

As illustrated, two sections are utilized as the coupling 24. However, it should be appreciated that one or more than two sections can be used as the coupling 24. Additionally, in some embodiments, radial flux couples opposite poles of the portions of the magnets of the coupling 24. That is a first portion of the coupling 24 having a magnet with a first polarity 26 is coupled to a second portion of the coupling 24 having a magnet with a second polarity 28 to couple the sections of the coupling 24 to one another. Additionally, as illustrated, the coupling 24 can be installed about an existing drive shaft 12 without removal of the drive shaft 12 from the vessel. For example, the coupling 24 can be coupled about the hub mounts 20 subsequent to installation of the hub mounts 20 about the drive shaft 12 so that the coupling 24 is directly constructed on an existing drive shaft 12 of the vessel.

Returning to FIG. 2, the coupling 24 (and/or the hub mounts 20) may additionally be held in place via one or more clamps 30 (e.g., side clamps). The one or more clamps 30 may be affixed to end portions (i.e., end faces) of the coupling 24 to, for example, form a circular cylinder which encompasses a rotating magnetic field of an outer coupling (i.e., coupling 32). In some embodiments, the one or more clamps 30 may be formed from non-magnetic materials, such as ceramic, plastics, non-magnetic metals or may be formed, for example, from non-magnetic steel. In some embodiments, one or more clamps 30 may be disposed on a single end of the coupling 24 or, for example, may be disposed on both ends of the coupling 24 (as illustrated in FIG. 2). Additionally, as illustrated, the one or more clamps 30 can be installed about an existing drive shaft 12 without removal of the drive shaft 12 from the vessel. For example, the one or more clamps 30 can be coupled to the ends of coupling 24 (or to the ends of the coupling 24 and the ends of the hub mounts 20) subsequent to installation of the coupling 24 about the drive shaft 12.

FIG. 2 additionally illustrates coupling 32 (e.g., an outer coupling, outer coupler, or female coupling) which may include, for example, encapsulated magnets that circumferentially surround the coupling 24. Thus, for example, the coupling 32 completely circumferentially surrounds the coupling 24; however, as discussed in greater detail below, the coupling 32 may not physically contact the coupling 24. Instead, the outer coupling (i.e., coupling 32) may coaxially surround the inner coupling (i.e., coupling 24) with a radial gap disposed therebetween. Thus, the coupling 32 may be a split female magnetic coupling that wraps around a split male magnetic coupling (e.g., the coupling 24). The radial gap disposed between coupling 24 and coupling 24 can be advantageous as it prevents physical contact between the inner coupling (coupling 24) and the outer coupling (coupling 32), such that, for example, force applied on the drive shaft 12 by the magnetic coupler 14 during operation of the drive shaft 12 is free from or has minimal resonance associated with operation of the magnetic coupler 14 and does not, for example, apply drag on the vessel.

Figure 4:
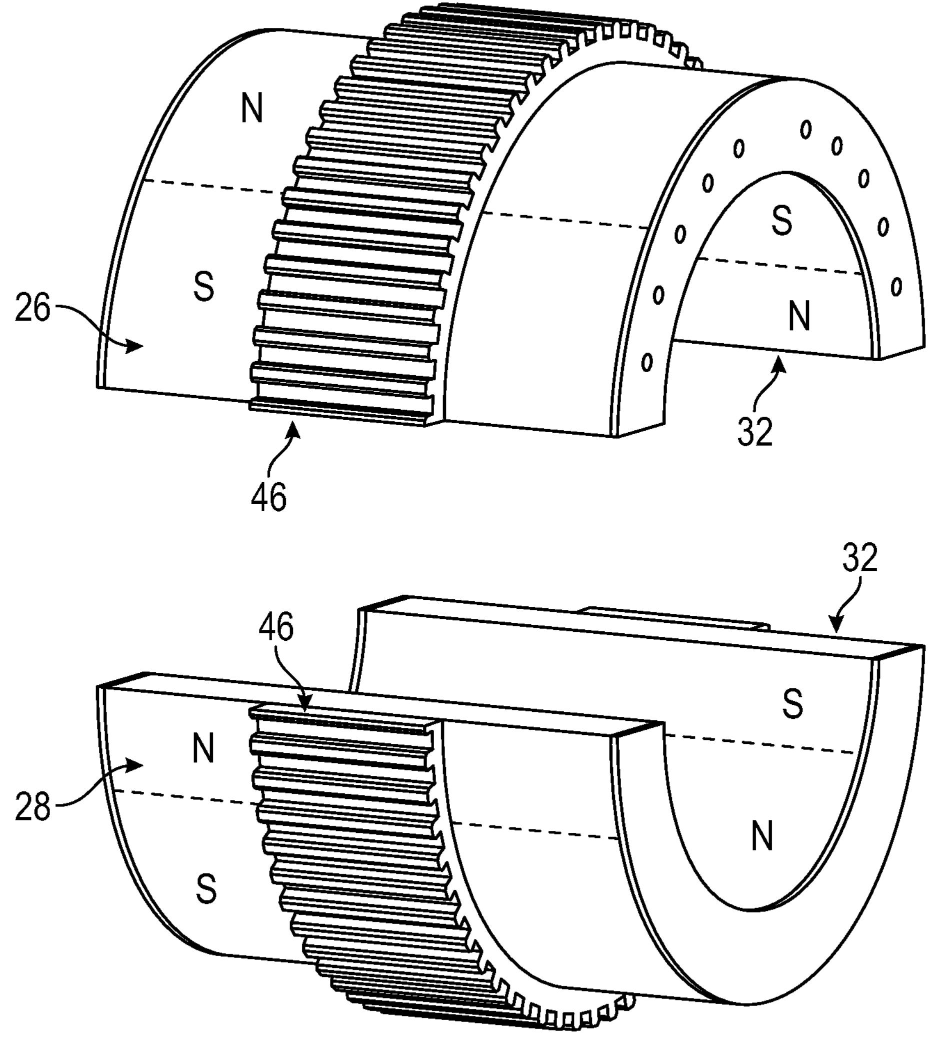
FIG. 4 illustrates an exploded side view of a second portion of the drive system of FIG. 1, in accordance with an embodiment.

FIG. 4 illustrates two sections utilized as the coupling 32. However, it should be appreciated that one or more than two sections can be used as the coupling 32. Additionally, in some embodiments, radial flux couples opposite poles of the portions of the magnets of the coupling 32. That is a first portion of a coupling 32 with a magnet having a first polarity 26 is coupled to a second portion of the coupling 32 with a magnet having a second polarity 28 to couple the sections of the coupling 32 to one another. Additionally, as illustrated, the coupling 32 can be installed about an existing drive shaft 12 without removal of the drive shaft 12 from the vessel. For example, the coupling 32 can be installed about (i.e., circumferentially about) the coupling 24 subsequent to installation of the coupling 24 about the hub mounts 20. However, the coupling 32 may not be directly coupled to the coupling 24; instead, a gap may be disposed between the coupling 32 and the coupling 24 across a length of the coupling 32 and the coupling 24.

Figure 5:
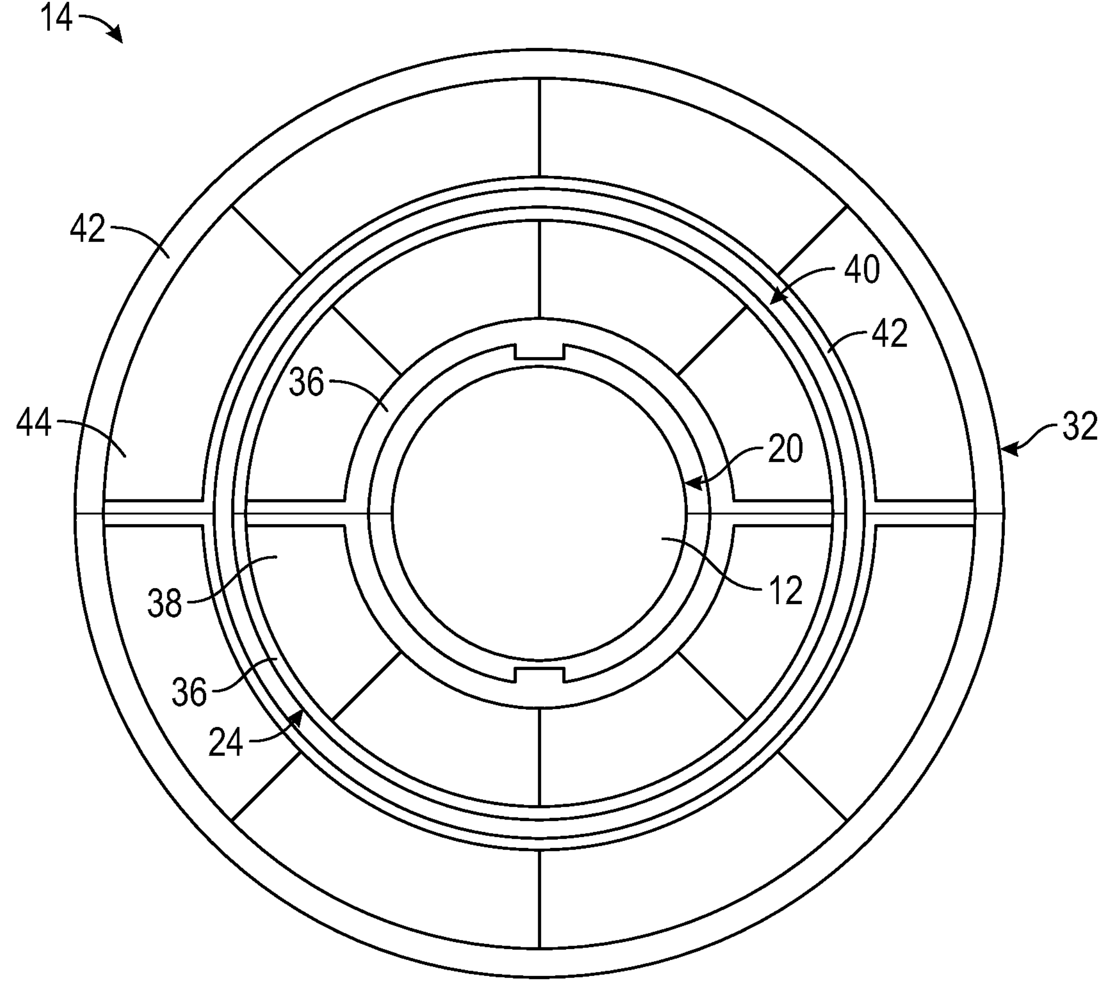
FIG. 5 illustrates a cross-sectional front view of a first embodiment of a magnetic coupler of the drive system of FIG. 1, in accordance with an embodiment.

Indeed, FIG. 5 illustrates a cross-sectional front view of the magnetic coupler 14 in accordance with one embodiment. As illustrated, the drive shaft 12 is disposed in the centermost region of the magnetic coupler 14. The one or more hub mounts 20 are directly coupled to the drive shaft and circumferentially surround the drive shaft 12. A housing 36 may be a part of the coupling 24 and may be directly coupled to the one or more hub mounts. The housing 36 may be a magnetic material, for example, magnetic steel and may operate as an inner surface of the coupling 24. Additionally, the coupling 24 may include magnets 38. As illustrated, the magnets 38 may be radially oriented (i.e., radially magnetized). In some embodiments, the magnets 38 may be made of samarium cobalt, however, alternate materials can be utilized to produce the magnets 38.

As illustrated in FIG. 5, the housing 36 may encase the magnets 38. This may be visually represented by the housing 36 including both an inner surface directly coupled to the one or more hub mounts 20 and an outer surface adjacent to (e.g., directly contacting) gap 40 (e.g., a cylindrical gap). The gap 40 may be filled with air. However, in other embodiments, the gap 40 may instead be filled with a non-magnetic material such as gas, water, vacuum, plastic, etc. Additionally disposed in direct contact with gap 40 is housing 42 of the coupling 32.

The housing 42 may be a part of the coupling 32 and, as illustrated, may be directly contact the gap 40. The housing 42 may be a magnetic material, for example, magnetic steel and may operate as an inner surface of the coupling 32. The housing 42 may further encase magnets 44 of the coupling 32. This may be visually represented by the housing 42 including both an inner surface in direct contact with the gap 40 and an outer surface. Similar to magnets 38, magnets 44 of the coupling 32 may be radially oriented (i.e., radially magnetized). This radial configuration can be utilized, for example, in conjunction with medium torque and high-speed propellers 18 (or impellers/turbines) like smaller vessels and boats. Furthermore, in some embodiments, the magnets 44 may be made of the same material as that used in the magnets 38; however, different materials for magnets 44 and magnets 38 may be utilized. However, it should be noted that radial flux couples opposite poles of the female/male magnet portions of each of magnets 44 and magnets 38.

Figure 6:
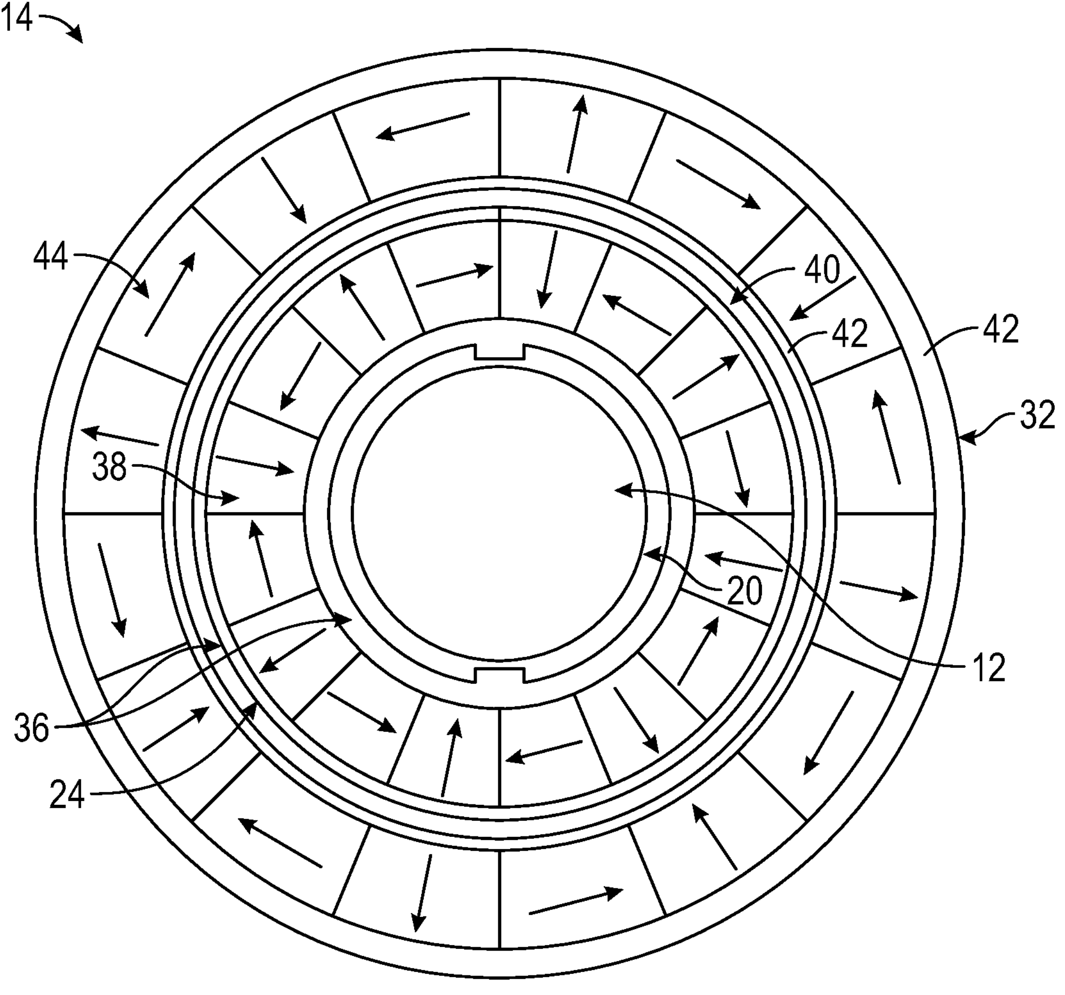
FIG. 6 illustrates a cross-sectional front view of a second embodiment of the magnetic coupler of the drive system of FIG. 1, in accordance with an embodiment.

The radial orientation of magnets 38 and magnets 44 as described in conjunction with FIG. 5 may not be the only orientation of the magnets 38 and 44. FIG. 6 illustrates a cross-sectional front view of a second embodiment of the magnetic coupler 14. The magnetic coupler 14 of FIG. 6 is similar to the magnetic coupler 14 of FIG. 5; however, the orientation of magnets 38 and magnets 44 are in a Halbach configuration in FIG. 6 rather than a radial orientation, as presented in FIG. 5. This second embodiment may provide additional torque with the same volume of magnetic material for magnets 38 and magnets 44 (e.g., approximately 2×, 3×, 4×, or another amount or torque). The Halbach configuration represents a more complicated configuration of the magnetic field and can be used, for example, in high speed, high torque configurations/applications that prioritize zero-slip/backlash.

Additionally, in some embodiments, alternate orientations of the magnets 38 and magnets 44 may be implemented. For example, the magnets 38 and magnets 44 may be tangentially oriented (i.e., tangentially magnetized) or axially oriented (i.e., axially magnetized). The coupling field can be arranged in a radial configuration (as provided in FIG. 5) or a Halbach configuration (as provided in FIG. 6) depending upon, for example, the desired coupling force between the coupling 24 and the coupling 32 to give a positive engagement. Moreover, this will allow any respective propeller 18 (or impeller/turbine) to rotate at the needed torque and speed. However, depending upon the application, cost economics, power-to-weight ratio, etc., magnets can be arranged in any coupling, split or non-split, in any of the above configurations (e.g., radial, axial, Halbach, etc.). In this manner, the choice of magnet configuration can be based on application needs and cost economic needs that relate to a given volume, power, speed and torque.

Returning to FIG. 4, a gear 46 may be directly coupled to an outer surface of the coupling 32. The gear 46 may be mechanically mated to or machined into the coupling 32 (e.g., into the housing 42 about the magnets 44). In this manner, for example, the gear 46 may be cut on the coupling 32, which is an integral part of the magnetic field of the coupling 32 (i.e., the outer coupling). The gear 46, when in operation, allows for gearing from the drive source 16 to the coupling 32 to cause rotation of the coupling 32. This rotation, in turn, causes rotation of the coupling 24, which is imparted to the hub mounts 20 and, according, to the drive shaft 12 to provide rotation thereto. In some embodiments, the gear 46 may be formed from non-magnetic materials, such as ceramic, plastics, non-magnetic metals or may be formed, for example, from non-magnetic steel.

Returning to FIG. 2, the coupling 32 may additionally be held in place via one or more clamps 48. The one or more clamps 48 may be affixed to end portions (i.e., end faces) of the coupling 32. In some embodiments, the one or more clamps 48 may be formed from non-magnetic materials, such as ceramic, plastics, non-magnetic metals or may be formed, for example, from non-magnetic steel. In some embodiments, one or more clamps 48 may be disposed on a single end of the coupling 32 or, for example, may be disposed on both ends of the coupling 32 (as illustrated in FIG. 2). Additionally, as illustrated, the one or more clamps 48 can be installed about an existing drive shaft 12 without removal of the drive shaft 12 from the vessel. For example, the one or more clamps 48 can be coupled to the ends of coupling 32 subsequent to installation of the coupling 32 about the drive shaft 12. Once attached via the clamps 48, the coupling 32 operates as a split magnetic field coupling that magnetically engages with the coupling 24 (i.e., the split male magnetic coupling).

The magnetic coupler 14 may additionally be disposed within one or more mounting brackets 50 that are coupled to a hull (or deck or other area) of the vessel. For example, the one or mounting brackets 50 may be split stands that support the magnetic coupler 14 and interface with, for example, the coupling 32. Likewise, in some embodiments, a plate may be disposed between the mounting brackets 50 and the hull or another surface of the vessel to allow for the drive system 10 to be installed. The mounting brackets 50 may include sections 52 and sections 54 that may be coupled to one another to complete a cylindrical portion that can be coupled to and circumferentially surround the coupling 32. An inner portion 56 of the sections 52 and 54 may include a low-friction material, for example, Teflon-graphite material or another low-friction material (e.g., a composite material), that allows for rotational motion of the coupling 32 relative to mounting brackets 50. Alternatively, the inner portion 56 may include one or more bearings or other friction reduction elements to allow for movement of the coupling 32 with respect to the mounting brackets 50.

The mounting brackets 50 can be installed about an existing drive shaft 12 without removal of the drive shaft 12 from the vessel. For example, the mounting brackets 50 can be coupled about the coupling 32 and attached to the hull (or deck or other area) subsequent to installation of the coupling 32 about the coupling 24 (which operates to provide a full circular magnetic field). Additionally, the mounting brackets 50 may be disposed at a distance 58 from one another to allow for gear 46 to reside in an area therebetween. This can allow the gear 46 to mesh with a gear 60 that is coupled to the drive source 16. Thus, in operation, by adding the drive system 10 to a vessel (e.g., in addition to the engine of the vessel), hybrid powering and/or electric only powering of the vessel may be accomplished. That is, the drive system 10 can be utilized in parallel with the engine of the vessel to rotate the drive shaft 12 to power the propeller 18.

More specifically, the drive source 16 may operate to rotate the gear 60. More specifically, the drive source 16 operates to externally drive the coupling 32 through a gearing of any sorts (e.g., gear 46 and gear 60 and/or additional or different gears) or, for example, a belt when power is applied to the drive source 16. As illustrated, rotation of the gear 60 causes rotation of gear 46 (due to their direct contact with one another). This imparts rotation to the coupling 32 and the rotation of the magnets 44 cause a corresponding rotation of the magnets 38, yielding rotation of the coupling 24. That is, when power transmission is applied to the coupling 32 via the gear 46, the coupling 32 engages the coupling 24 due to the coupling effect of the magnetic fields and enables transmission of power between the coupling 32 and the coupling 24. Moreover, due to its direct contact with the one or more hub mounts 20, rotation of the coupling 24 causes rotation of the one or hub mounts 20 and, thus, rotation of the drive shaft 12 coupled to the one or more hub mounts 20. That is, the power transmitted from the coupling 32 to coupling 24 by an external prime mover (i.e., drive source 16) allows for the transmission of torque/power to the drive shaft 12 of the vessel magnetically without any physical contact between the coupling 32 and the coupling 24. That is, when the coupling 32 rotates it magnetically engages the coupling 24 and causes a transmission of power to the drive shaft 12 of the propeller 18 (or an impeller/turbine) of the vessel.

In this manner, the drive system operates as a parallel (hybrid) power source for the vessel. One advantage of this process and system is that there is no axial loading or single point load on the drive shaft 12 of the propeller 18 (or impeller/turbine) of the vessel. Indeed, this process and system allows for a uniform torque 360 degrees from the coupling 32 to the coupling 24.

Additionally, in some embodiments, the engine of the vessel may be shut down and the drive system 10 alone may impart rotation to the drive shaft 12 to power the propeller 18 in the manner described above. Likewise, the drive source 16 can function as a generator to charge a power source coupled thereto. For example, the coupling may receive torque from the drive shaft 12 via the magnetic coupler 14 through gear 46 and gear 60, causing electricity to be generated and transmitted to the power source to recharge the power source). In other embodiments, the power source can be independently be charged or replaced separate from operation of the drive system 10.

Figure 7:
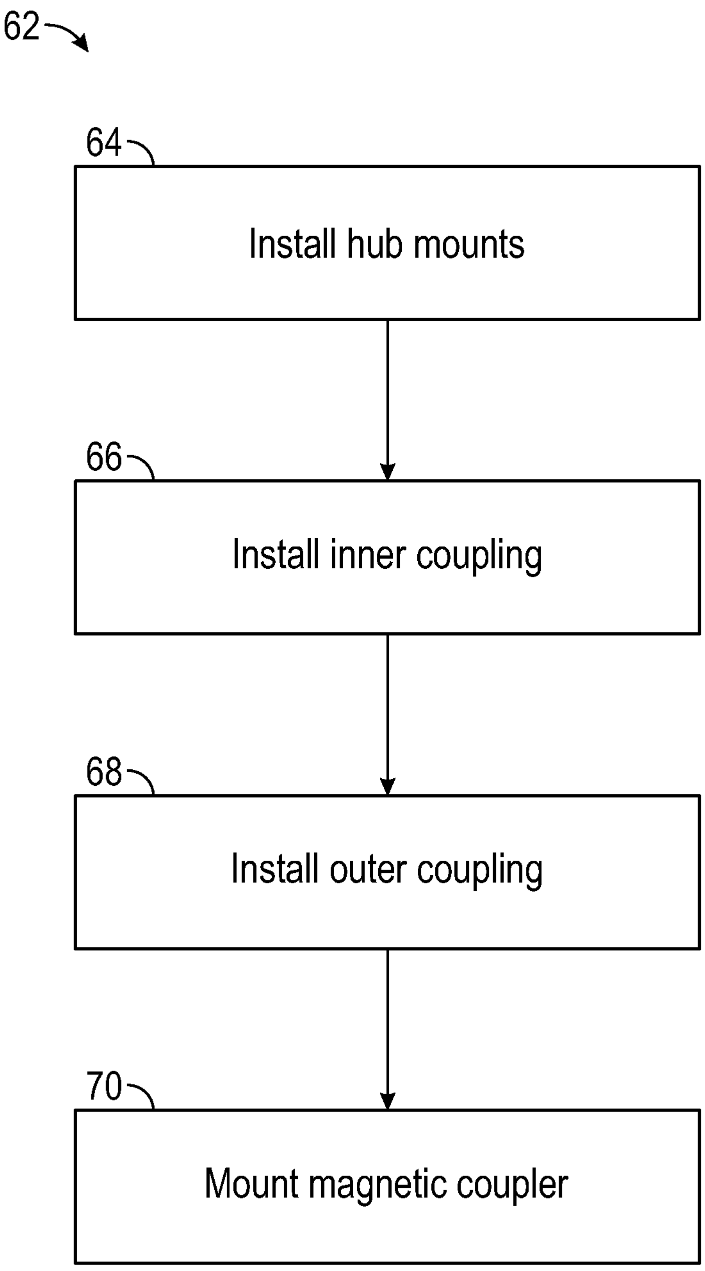
FIG. 7 illustrates a flow chart describing installation of the magnetic coupler of FIG. 1, in accordance with an embodiment.

FIG. 7 illustrates a method 62 to install the magnetic coupler 14 on a vessel. It should be noted that method 62 may be done in connection with installation of the drive source 16, its power source, any associated controllers and/or control systems, as well as installation of the one or more mounting brackets 50 being coupled to a hull (or deck or other area) of the vessel. In step 64, one or hub mounts 20 can be coupled to the drive shaft 12. As part of step 64, respective segments of the one or more hub mounts 20 can be coupled to one another via, for example, a connector or fastener. Thereafter, in step 66, an inner coupling (e.g., coupling 24) as a split coupling (i.e., a coupling having may be installed. As part of step 66, the coupling 24 can be coupled about the hub mounts 20 subsequent to installation of the hub mounts 20 about the drive shaft 12 so that the coupling 24 is directly constructed on an existing drive shaft 12 of the vessel. Additionally, as part of step 66, the one or more clamps 30 may be coupled to the coupling 24 (and/or the hub mounts 20).

In step 68, an outer coupling (e.g., coupling 32) may be installed. As previously discussed, coupling 32 may not physically contact the coupling 24. Instead, the outer coupling (i.e., coupling 32) may coaxially surround the inner coupling (i.e., coupling 24) with a radial gap disposed therebetween. Moreover, as part of step 68, the one or more clamps 48 may be affixed to end portions (i.e., end faces) of the coupling 32. Thereafter, in step 70, the magnetic coupler (formed of the one or more hub mounts 20, the coupling 24, and the coupling 32) can be mounted, for example, onto the one or more mounting brackets 50. As part of step 70, the gear 46 may be directly coupled (i.e., the gears of gear 46 and gear 60 may be meshed) and the sections 52 may be coupled to sections 54 to complete the assembly of the one or mounting brackets 50.

Furthermore, it should be noted that the aforementioned steps may be altered in order and/or portions of the steps may be performed out of the illustrated order. For example, a bottommost section of coupling 32 may be disposed on section 54 of the one or more mounting brackets 50 prior to initiating step 64. Step 66 may occur thereafter followed by completion of step 68 via connecting a topmost section of coupling 32 to the bottommost section disposed on section 54 of the one or more mounting brackets 50.

This written description uses examples to disclose the above description to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Accordingly, while the above disclosed embodiments may be susceptible to various modifications and alternative forms, specific embodiments have been shown by way of example in the drawings and have been described in detail herein. However, it should be understood that the embodiments are not intended to be limited to the particular forms disclosed. Rather, the disclosed embodiment are to cover all modifications, equivalents, and alternatives falling within the spirit and scope of the embodiments as defined by the following appended claims.

What is claimed is:

1. A system, comprising:

a magnetic coupler comprising:

an inner coupling comprising at least two first sections, wherein the inner coupling is configured to be coupled to a drive shaft of a vessel; and an outer coupling comprising at least two second sections, wherein the outer coupling is configured to coaxially surround the inner coupling with a radial gap disposed therebetween, wherein the outer coupling comprises an outer surface comprising a gear; and a drive source configured to be coupled to the outer coupling of the magnetic coupler, wherein the gear is configured to couple the drive source to the outer coupling.

2. The system of claim 1, comprising a hub mount comprising at least two third sections coupled directly together.

3. The system of claim 2, wherein the hub mount is configured to be directly coupled to the drive shaft of the vessel and disposed about the drive shaft of the vessel.

4. The system of claim 3, wherein the hub mount comprises metal or a carbon-metal composite.

5. The system of claim 4, wherein the inner coupling is configured to be disposed about and directly coupled to the hub mount.

6. The system of claim 1, wherein a fourth section of the at least two first sections of the inner coupling comprises a first magnet having a first polarity and a fifth section of the at least two first sections of the inner coupling comprises a second magnet having a second polarity.

7. The system of claim 6, wherein the first magnet and the second magnet are configured to be in a radial orientation to be radially magnetized.

8. The system of claim 6, wherein the first magnet and the second magnet are configured to be in a Halbach configuration.

9. The system of claim 6, wherein the first magnet and the second magnet are configured to be in a tangential orientation to be tangentially magnetized or in an axial orientation to be axially magnetized.

10. The system of claim 1, wherein a fourth section of the at least two second sections of the outer coupling comprises a first magnet having a first polarity and a fifth section of the at least two second sections of the outer coupling comprises a second magnet having a second polarity.

11. The system of claim 10, wherein the first magnet and the second magnet are configured to be in a radial orientation to be radially magnetized.

12. The system of claim 11, wherein the first magnet and the second magnet are configured to be in a Halbach configuration.

13. The system of claim 12, wherein the first magnet and the second magnet are configured to be in a tangential orientation to be tangentially magnetized or in an axial orientation to be axially magnetized.

14. A system, comprising:

a magnetic coupler comprising:

a hub mount comprising a first section and a second section configured to be coupled directly together, wherein the hub mount is configured to be directly coupled to and disposed about a drive shaft of a vessel;

an inner coupling comprising a third section comprising a first magnet and a fourth section directly coupled to the third section, wherein the fourth section comprises a second magnet, and wherein the inner coupling is configured to be directly coupled to and disposed about the hub mount; and an outer coupling comprising a fifth section comprising a third magnet and a sixth section directly coupled to the fifth section, wherein the fifth section comprises a fourth magnet, and wherein the outer coupling is configured to coaxially surround the inner coupling with a radial gap disposed therebetween; and a mounting bracket configured to be coupled to a hull of the vessel, wherein the mounting bracket is configured to support the magnetic coupler while allowing for rotation of the magnetic coupler with respect to the mounting bracket.

15. The system of claim 14, comprising a fastener configured to directly couple the first section to the second section.

16. The system of claim 14, comprising a first clamp configured to directly couple the third section to the fourth section and a second clamp configured to directly couple the fifth section to the sixth section.

17. A method, comprising:

directly coupling a first section of a hub mount to a second section of the hub mount about a drive shaft of a vessel;

directly coupling a third section of an inner coupling comprising a first magnet to a fourth section of the inner coupling comprising a second magnet about the hub mount;

directly coupling a fifth section of an outer coupling comprising a third magnet to a sixth section of the outer coupling comprising a fourth magnet about the inner coupling with a radial gap disposed therebetween to form a magnetic coupler comprising the hub mount, the inner coupling, and the outer coupling; and disposing the magnetic coupler in a mounting bracket coupled to a hull of the vessel, wherein the mounting bracket is configured to support the magnetic coupler while allowing for rotational movement of the magnetic coupler with respect to the mounting bracket.

* * * * *